May 21, 1963 W. M. MERRITT ET AL 3,090,354
BIRD FEEDERS
Filed July 29, 1960

INVENTORS
W. M. MERRITT
and FRANK F. FORTH
BY
ATTORNEY

United States Patent Office 3,090,354
Patented May 21, 1963

3,090,354
BIRD FEEDERS
Willie M. Merritt and Frank F. Forth, Warwick, Ga., assignors to Merritt Bird Feeder Company, Warwick, Ga.
Filed July 29, 1960, Ser. No. 46,223
11 Claims. (Cl. 119—52)

This invention relates to improvements in bird feeders, and more particularly to an improved feeding device designed for the feeding of wild birds such as quail and pheasants on managed ranges.

Stated broadly, the invention contemplates and provides an efficient ground-type feeder for wild birds such as quail and pheasants for use on controlled ranges or preserves, wherein provision is made for the protection of the feed contained therein against climatic conditions likely to promote if not cause food spoilage, and whose design and construction are such as to make the feed readily available to birds but extremely difficult of access to both likestock feeding on the same range and smaller wild animals such as opossums and raccoons.

Another important object of the invention is the provision of a bird feeder of the stated character having improved feed-access means designed to render the feed readily available to the smaller game birds such as quail and pheasant, but which substantially minimizes loss of feed to small animals such as opossums and raccoons, which are known to pull feed out through the feed openings of the conventional ground-type bird feeders.

Yet another major object of the invention is the provision of a ground-type bird feeder for quail, pheasants and the like which incorporates means for the scientific control of rats and mice, which is an important factor in the management of game bird ranges.

A still further object of the invention is the provision of a ground-type feeder for use in the large-scale feeding of game birds such as quail and pheasants on controlled ranges, whose construction and design are such that damage to the feeders by large animals, particularly livestock feeding on the same range, is minimized.

Yet another object of the invention is the provision of a ground-type bird feeder for small wild birds such as quail and pheasant which incorporates means whereby it may be readily identified and/or located following its original placement, thus greatly simplifying the servicing and maintenance of a large number of such feeders distributed throughout a range.

Ancillary yet highly practical objects of the invention are the provision of an improved ground-type feeder for large-scale use on ranges stocking quail, pheasant and like small game birds which is characterized by inexpensive, rugged construction and ease of assembly; and the provision of such a feeder which is in addition thoroughly dependable in use, easy to service and maintain in good working condition.

The above and other objects and features of advantage of an improved bird feeder according to the present invention will appear from the following detailed description thereof, in which reference is had to the accompanying illustrated drawing in which.

Figures 6A, 6B:
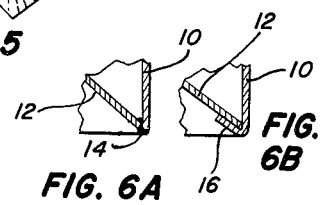
FIGS. 6A and 6B are detail views illustrating alternate forms of connecting the lower edges of the distributing cone (also serving the feed receptacle bottom) and the cylindrical body member of the feed receptacle.

Referring to the drawings in detail, the improved feeder of the invention comprises a generally upright feed container or receptacle fashioned from an open-ended, preferably cylindrical body member 10, and a separately formed conical member 12 serving both as a receptacle bottom and as a feed distributing cone. As seen in FIG. 6A, the conical bottom member 12 may be permanently secured along its outer perimeter to the bottom edge of the cylindrical body member 10 by any appropriate means such as the weld 14. Alternately, however, the bottom may be simply held in bottom-forming relation to the receptacle body member 10 along the lower edge of the latter by providing said lower edge with an inwardly-upwardly inclined lip or flange 16 (FIG. 6B) against which the conical bottom member seats and is detachably secured, such alternate construction facilitating replacement of a conical bottom member as and when necessary.

The aforesaid feed receptacle is adapted to be supported on the ground by means of a base preferably comprising crossed arms 20, 22 fashioned from suitable lengths of weatherproofed wood. By proper choice of the size and length of said cross arms making up the same, the base provides the feeder with a firm foundation in the normal use thereof and further renders it substantially tip-proof to livestock or wild animals as would be likely to damage the feed receptacle and/or spill the feed contents thereof.

Figure 1:
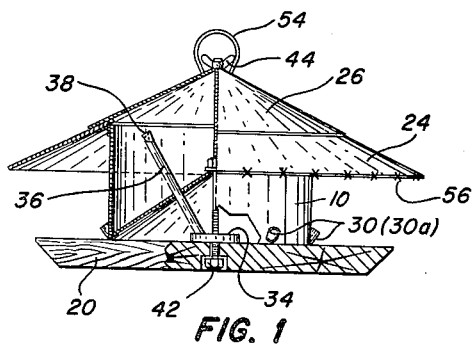
FIG. 1 is a broken-away side elevation, partly in section, of the improved bird feeder as herein proposed.
Figure 2A:
FIG. 2A is a broken-away view of the identification or location flag which may be employed with feeders according to the invention.
Figure 3:
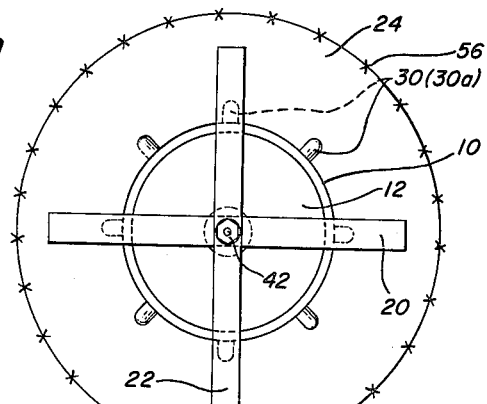
FIG. 3 is an underneath view of the feeder shown in FIG. 1.
Figure 2:
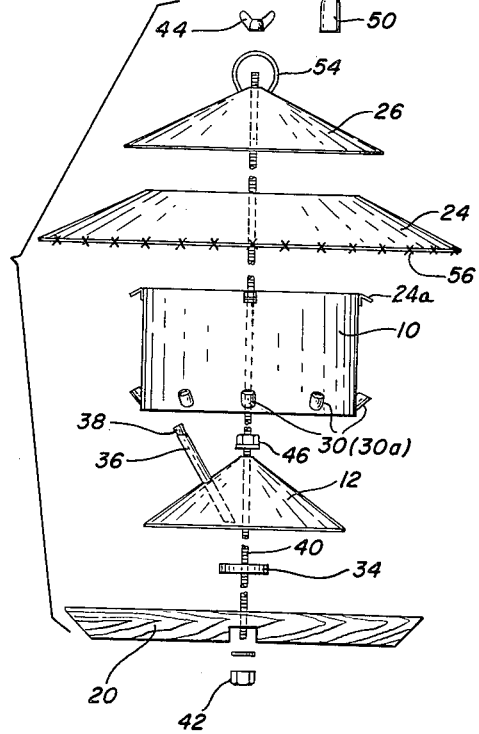
FIG. 2 is an exploded view thereof which illustrates the various parts, excepting one of the cross arms of the supporting base which has been omitted in the interest of simple disclosure, which make up the feeder and further suggests the manner of their assembly as a unit, although not necessarily indicating the order of such assembly.

Along its upper edge, the cylindrical body member of the feed receptacle mounts an outwardly-downwardly inclined attaching flange 24a for a so-called rain skirt 24 preferably having the form of a frustum of a cone whose lower larger-diameter end has diameter greatly exceeding that of the feed receptacle and whose upper smaller-diameter end has diameter less than that of said feed cylinder. Thus, when the rain skirt 24 is placed against and secured along its upper edge portion to the upper edge of the receptacle in which position it derives support from brackets 24a if such are provided, its outer-edge portion overhangs the feed receptacle and base, thus sheltering the lower end of the feed receptacle from the weather and also serving to limit access to the feed openings (spouts to be described) to the smaller-size birds and animals. Moreover, consequent to its inner edge extending a small distance inwardly over the top edge of the body member 10 of the feed receptacle, said rain skirt also serves both to prevent any substantial spilling of the feed contained in the receptacle in the event of tipping thereof and as a support for a cover or bonnet 26 serving to removably close off and thereby weather-seal the upper end of the feed receptacle. As best seen in FIGS. 1 and 2, said cover 26 is shaped as a cone having the same angle of coning as the rain skirt 24 and a base diameter appreciably greater than the inner-edge diameter of said skirt. Thus, when cover is seated on the inner edge of the rain skirt, the one extends in continuation of the other; that is, said cover and rain skirt form a continuous cone-shaped top and overhanging eaves for the feed receptacle.

Figures 4A, 4B:
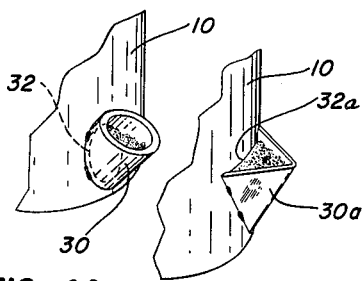
FIG. 4A is a fragmentary perspective view, on an enlarged scale, illustrating the construction and disposition of one form of so-called feed spout employed in the feeder shown in FIG. 1.
FIG. 4B is a similar view illustrating an alternate form of feed spout.

According to an important feature of the invention, the aforesaid feed receptacle is provided in its lower-end portion with a plurality of feed-access means in communication with the interior of the receptacle through openings in its side wall as will be described in detail, such means preferably having the form of upwardly-opening spouts disposed in circular series about said receptacle and arranged to project outwardly from the receptacle side wall. According to the FIG. 4A form thereof, such feed spouts designated 30 are fashioned from short-lengths of metal tubing of approximately one-half inch diameter whose lower ends are cut at an angle to the axis thereof such that, when secured along said end edges against the vertical side wall of the receptacle body member 10, the spouts incline upwardly-outwardly at an angle of approximately 45° to the horizontal. As also illustrated in FIG. 4A, the side wall of the receptacle is provided with suitably shaped and sized openings 32 as enables the lower ends of the spout-forming tubes to be secured by any suitable means to the edges of said openings. Alternately, and as depicted in FIG. 4B, the feed spouts may have triangular rather than tubular form. Thus, as indicated at 30a, they may be shaped much as a coffee-pot spout and, like the tubular spouts 30, have an opening of lateral dimension similarly of the order of one-half inch. Such triangular spouts are appropriately secured in place against the external wall surface of the feed receptacle, so as to extend about the openings 32a to the interior of the receptacle. Accordingly, whether formed tubular or triangular, the upwardly opening spouts offer limited communication to the interior of the feed receptacle and hence to the feed contained therein at spaced points along its lower-end circumference.

According to a further feature of the invention, the herein proposed feeder incorporates provision for the scientific control of rats and mice in the form of a sheltered bottom compartment for such animals in which a poison such as "Warfarin" may be maintained, thus protecting against loss of feed to such animals, and also insuring a more efficient use of the rat poison as compared to placing it on the ground around the feeder. Such rodent control means preferably comprises a small saucer-like tray 34 resting on and secured to the upper face of at least one of the cross arms 20, 22 of the base and preferably at the point at which said arms cross. Thus, the poison tray opens upwardly into the sheltered compartment formed by the under side of the conical bottom member 12 of the feed receptacle, but it is readily accessible to rats and mice which can enter said compartment through the quadrant-shaped spaces between the cross arms of the base.

Preferably, poison is supplied to the poison tray 34 through the feed receptacle from its upper end (without the necessity of upending said receptacle), by means of a generally upright tube 36 which extends through and is held in place as by welding to the conical bottom member 12. As seen in FIG. 1 the upper end of said tube 36 terminates near the top of the feed receptacle and at a point thereof such that it is readily accessible upon removal of the aforesaid cover 26, and its lower end terminates directly above the poison tray. Preferably, the upper end of the poison-feed tube 36 is sealed off from the interior of the feed receptacle as by means of a stopper or cork 38. Thus, upon removal of the receptacle cover 26 and stopper 38, poison may readily be supplied to the poison tray 34 as needed for the feed tube 36.

As indicated in FIG. 2, the component parts of the feed receptacle are preferably formed separate from one another for ready replacement as needed but are capable of being assembled to form the described feeder unit by the simple expedient of passing a suitably threaded elongated bolt or rod axially through said parts arranged in the proper sequence, and thereupon securing them together by top and bottom nuts threaded on to the opposite ends of the rod or by a single top nut threaded on to the upper end of the rod if the latter is formed as a bottom-headed through bolt. As illustratively shown in FIG. 2, wherein the through or mounting rod designated 40 (shown as broken but in practice being a one-piece rod) is threaded at both ends and top and bottom nuts 44, 42 are accordingly required, assembly of the component parts making up the feeder is effected by relating said parts to the rod as shown (the parts 12 and 14 having a central hole for said rod), and thereupon first threading the bottom nut 42 to the lower end of the rod, and thereafter threading the top nut 44 to the upper end of said rod, with sufficient tightening of the top nut as is required to hold the parts together. In the event that the conical bottom member 12 of the feed receptacle is formed separate from the receptacle body member 10, an intermediate nut 46 threadably related to the middle-length portion of the rod 40 is employed to hold said conical bottom member seated against the inturned bottom flange 16 of the body member, as described above, in connection with FIG. 6B.

According to a further feature of the invention, the rod (or bolt) 40 on which the aforesaid component parts making up the feeder are assembled, may also provide the means for mounting on each feeder an identification and/or location flag useful in the servicing and maintenance of a plurality of such feeders distributed over a large area such as a managed range or preserve. As shown in FIG. 2A, such a flag comprises an elongated staff 48 whose lower end is formed or provided with a nut 50 adapted to be screw-threaded on to the upper end of the aforesaid rod or bolt 40 in place of the aforesaid top nut 44 (shown to be a wing nut), the staff carrying at its upper end a preferably metal flag 52 bearing an identification number, for example. Consequent to the height of the staff 48 when mounted on a feeder, the flag will show above low foliage, for example, and thus the addition thereof to the feeder makes it relatively easy to identify and locate the feeder for servicing or maintenance purposes.

Figure 5:
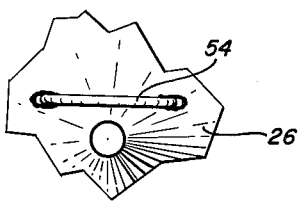
FIG. 5 is enlarged, fragmentary detail view illustrating the preferred offsetting of the cover or bonnet handle from the vertical axis of the feeder as a whole.

As illustrated in FIG. 5, the loop-form cover handle 54 is offset from the axis of the feeder as determined by the through rod 40. Thus, either the wing nut 44 or the nut 50 on the lower end of the location-flag staff 48 may be threaded on to and backed off from the upper end of the rod, without interference from said cover handle.

To discourage the larger-size animals from trying to gain access to the feed spouts 30, the outer perimeter of the rain skirt may carry a border of barb-wire designated 56 secured thereto as by soldering. Thus the rain skirt also serves as a barrier which limits the animals which can approach the feed spouts to the smaller sizes. In this latter connection, it will be understood that the feed spouts will be disposed at the natural and comfortable feeding height of game birds such as quail and pheasants, and also that the dimensioning of the feeder is such that the outer edge of the rain skirt is spaced from the ground a distance as to comfortably accommodate the height of the birds feeding from the feed spouts, thus to encourage the feeding habits of such birds while discouraging the larger-size animals and birds from using the feeder as a source of feed.

Without further analysis, it will be appreciated that a ground-type bird feeder for the large-scale feeding of quail, pheasants and like small-size game birds on controlled ranges and hunting preserves achieves the objectives of such a feeder as explained in the foregoing. Although the upwardly opening feed spouts 30 are so constructed and arranged as to provide small wild birds such as quail and pheasants ready access to the feed contained in the feed receptacle, the size and disposition of said spouts make it exceedingly difficult for animals, such as livestock, hogs, opossums, raccoons, etc. to reach this feed, with the result that feed saving is high as compared to other feeders used for similar purpose. The feeder of the invention is also notable in the control which it provides over rat and mice life, and thus introduces further feed saving due to the controlled extermination of such animals which tend to pilfer feed from bird feeders.

Another notable feature of the feeder of the invention is that all parts thereof may be standardized for ready replacement when such is required. Such of course eliminates discarding the entire feeder when one or more parts are rendered unserviceable due to weather conditions or when damaged by large animals, for example. The provision of identification or location flags in feeders of the type under consideration is also of decided advantage in that it greatly simplifies the operations of locating and servicing of feeders distributed at widely spaced locations over large areas, which is an important factor in range and/or wild life management.

As many changes could be made in carrying out the above constructions without departing from the scope of the invention, it is intended that all matter contained in the above description or shown in the accompanying drawing shall be interpreted as illustrative and not in a limiting sense.

I claim:

1. A ground-type feeder for use in feeding small game birds on ranges, game preserves and the like, comprising an upright feed container having a generally cone-type bottom for distributing feed in the container downwardly and outwardly therein, at least one feed spout adjacent the lower portion of said container, said spout extending outwardly and upwardly and said container having an opening therethrough in communication with that of said spout and being substantially coextensive therewith, the lateral dimension of at least said spout opening being of the order of a half inch, whereby said birds may feed from the spout but animals, particularly of the small animal group, may not pull the feed out through the spout onto the ground.

2. A game bird feeder according to claim 1, wherein said container is cylindrical, is provided in its lower portion with a plurality of said spouts arranged in circular series thereabout, and is mounted on a cross arm supporting base, the cross arms of said base extending a substantial distance laterally from the container thereby to render it substantially tip-proof to livestock and wild animals of the larger sizes.

3. A game bird feeder according to claim 1, wherein said container mounts means extending a substantial distance upwardly therefrom for indicating its location when placed in thickets and the like.

4. A game bird feeder according to claim 1, wherein said container is open on top and is provided with a plurality of said spouts arranged in spaced relation about its lower portion as aforesaid, and wherein a rain skirt is secured to the container along its open-top edge and extends downwardly and outwardly therefrom in weather-protective relationship over the spouts, and wherein a cover for said container is supported on the upper edge of said rain skirt.

5. A game bird feeder according to claim 4, wherein said feed container is cylindrical, said rain skirt is frusto-conical and said cover is conical, and said skirt and cover have substantially the same coning angle whereby the one extends in continuation of the other.

6. A game bird feeder according to claim 4, wherein said container is mounted on a cross-arm supporting base, and wherein an open-top receptacle for poison pellets is secured to the upper side of said base centrally thereof, said receptacle having substantially smaller lateral dimension than said container whereby the container bottom provides a sheltered space over and about the tray, and a pellet feed-tube affixed to and extending upwardly through said bottom from a point above the tray to near the upper end of the container, whereby said tube is accessible from its upper end upon removal of the container cover.

7. A ground-type bird feeder for use in feeding small game birds on ranges, game preserves, and the like comprising, in combination, a cylindrical feed receptacle, a crossed-arm supporting base therefor, the receptacle having an open top and being provided adjacent its lower end with outwardly projecting, upwardly opening, individual feed spouts communicating with the receptacle interior, a frusto-conical rain skirt secured to the open top-edge of the receptacle and dimensioned so that its larger-diameter lower end overhangs the receptacle and feed spouts and its smaller diameter upper end extends inwardly over the open top of said receptacle, a removable, conically-shaped cover of diameter greater than that of upper end of the rain skirt so as to overlie said upper end and having substantially the same coning angle as said rain skirt whereby the one extending in continuation of the other, a through bolt extends coaxially through said base, receptacle and cover, and a removable nut threaded on to at least the upper end of the bolt and bearing on the apex portion of the cover for securing said parts together as an assembled unit.

8. A bird feeder as defined in claim 1, wherein said nut is carried by the lower end of an elongated staff which mounts indicia-carrying means at its upper end.

9. A bird feeder according to claim 7, wherein said side wall portion of the receptacle is provided with an inturned flange, said receptacle has a conical bottom which is formed separate from the receptacle side wall portion, and said bolt mounts means intermediate its ends abutting the apex portion of said bottom for holding its lower edge to said inturned flange, said bolt having threaded upper and lower ends, and removable nuts including said first-named nut threaded on said ends and respectively bearing on the apex portion of the cover and on the under side of the supporting base.

10. A bird feeder as defined in claim 7, wherein said receptacle has a conical bottom which is formed separate from the receptacle side wall portion and said bottom is secured in bottom-forming relation with respect to said side wall portion by a nut threaded on to the intermediate length portion of said through bolt and bearing against the apex portion of said conical bottom.

11. A bird feeder as defined in claim 10, wherein said side wall portion of the receptacle is provided along its bottom edge with an inturned flange and the lower edge of the conical bottom is supported on and bears against said flange thereby to provide a receptacle bottom wall.

References Cited in the file of this patent

UNITED STATES PATENTS

| | | |
|---|---|---|
| 1,120,178 | Berghofer | Dec. 8, 1914 |
| 1,404,251 | Westenberger | Jan. 24, 1922 |
| 1,477,121 | Henderson | Dec. 11, 1923 |
| 1,531,842 | Carpenter | Mar. 31, 1925 |
| 1,534,375 | Foucht | Apr. 21, 1925 |
| 1,614,394 | Robison | Jan. 11, 1927 |